US008868224B1

(12) United States Patent
Triolo et al.

(10) Patent No.: US 8,868,224 B1
(45) Date of Patent: Oct. 21, 2014

(54) COMPUTER-IMPLEMENTED SYSTEMS AND METHODS FOR VOLATILE ORGANIC COMPOUND CALCULATIONS

(75) Inventors: Michael T. Triolo, Pine Bush, NY (US); Joseph J. Jaccoi, Cresskill, NJ (US)

(73) Assignee: The Sherwin-Williams Company, Cleveland, OH (US)

( * ) Notice: Subject to any disclaimer, the term of this patent is extended or adjusted under 35 U.S.C. 154(b) by 1635 days.

(21) Appl. No.: 11/733,560

(22) Filed: Apr. 10, 2007

Related U.S. Application Data

(60) Provisional application No. 60/791,309, filed on Apr. 10, 2006.

(51) Int. Cl.
*G06Q 10/06* (2012.01)
*G06F 17/50* (2006.01)
*G05B 17/02* (2006.01)

(52) U.S. Cl.
USPC ............... 700/97; 700/29; 700/117; 700/123; 705/7.12

(58) Field of Classification Search
USPC ............ 705/7, 26, 7.12; 700/117, 123, 29, 97
See application file for complete search history.

(56) References Cited

U.S. PATENT DOCUMENTS

| 4,406,704 | A | * | 9/1983 | Troutman | 106/259 |
| 6,064,919 | A | * | 5/2000 | Slusarczyk | 700/117 |
| 6,073,055 | A | * | 6/2000 | Jahn et al. | 700/97 |
| 6,882,980 | B1 | * | 4/2005 | Schuller | 705/37 |
| 7,113,919 | B1 | * | 9/2006 | Norris et al. | 705/26.5 |
| 2003/0110101 | A1 | * | 6/2003 | Friel et al. | 705/28 |

* cited by examiner

*Primary Examiner* — Matthew Gart
*Assistant Examiner* — Reva R Danzig
(74) *Attorney, Agent, or Firm* — Jones Day

(57) ABSTRACT

Computer-implemented systems and methods for use in processing a paint batch. As an example, a system and method can include an input software mechanism for receiving input data related to the paint batch. Volatile organic compound software instructions are configured to determine an addition amount of solvent to add to the paint batch. The addition amount of solvent is determined based upon the input related to the paint batch and upon pre-specified criteria.

18 Claims, 9 Drawing Sheets

| | A | B | C | D | E | F | G | H | I | J | K | L | M | N | O |
|---|---|---|---|---|---|---|---|---|---|---|---|---|---|---|---|
| 1 | VOC | Calculation and Batch Addition Tool | | | | | | | | | | | | | |
| 2 | | Semi | D0-Z/Z/Z | enter size | enter %nv | enter ppg | Calc voc | Calc solids | enter voc variable | add lbs ms | add gallons ms | ok add ms | profit batch | yield gallons | target %nvm |
| 3 | Tank | DATE | batch wt | | | | | | | | | | | | |
| 4 | O-10 | mm/dd /yy | 20331 | 2700 | 52.27 | 7.53 | 431 | 10627 | 447 | 734 | 115 | yes | $371 | 2,815 | 50.45 |

| | P | Q | R | S | T | U |
|---|---|---|---|---|---|---|
| 1 | | | | | | |
| 2 | product | cost ms | voc<444.6 | validate | $>Target | enter $target |
| 3 | $/Gal | $/gal ms | | | | |
| 4 | $5.06 | $1.61 | 371 | 371 | 371 | 19 |

FIG. 6

COMPUTER-IMPLEMENTED SYSTEMS AND METHODS FOR VOLATILE ORGANIC COMPOUND CALCULATIONS

CROSS-REFERENCE TO RELATED APPLICATION

This application claims priority to and the benefit of U.S. Application Ser. No. 60/791,309 (entitled "Computer-Implemented Systems and Methods for VOC Calculations" and filed on Apr. 10, 2006), of which the entire disclosure (including any and all figures) is incorporated herein by reference.

TECHNICAL FIELD

This document relates generally to computer-implemented systems and methods for batch processing, and more particularly to computer-implemented systems and methods for volatile organic compound determinations.

BACKGROUND AND SUMMARY

Manufacturing batches of paint or other compositions involve a set of factors that are typically difficult to assess for ensuring that the batches are properly and efficiently made. For example, technical factors (such as to how the batches should be processed) may conflict with governmental restrictions on the amounts of certain batch components, such as volatile organic compounds (VOCs).

In accordance with the teachings provided herein, systems and methods for operation upon data processing devices are provided for use in processing a batch. As an example, a system and method can include an input software mechanism for receiving input related to the batch. Volatile organic compound software instructions are configured to determine an addition amount of solvent to add to the batch. The addition amount of solvent is determined based upon the input related to the batch and upon pre-specified criteria.

As another example, a system and method can include an input software mechanism (e.g., a user input interface, software APIs, etc.) for receiving input data related to a paint batch. Volatile organic compound software instructions are configured to determine an addition amount of solvent to add to the paint batch. The addition amount of solvent is determined based upon the input data related to the paint batch and upon pre-specified criteria. The criteria includes a governmental-related criteria that limits amount of volatile organic compounds within a paint batch, and includes financial (e.g., economic) criteria related to increasing profitability in processing the paint batch. The determined addition amount of solvent is used in generating the paint batch.

BRIEF DESCRIPTION OF THE DRAWINGS

FIG. 6 is a screen display of a batch addition tool for calculating an addition to a production batch and profitability of such an addition.

DETAILED DESCRIPTION

Figure 1:
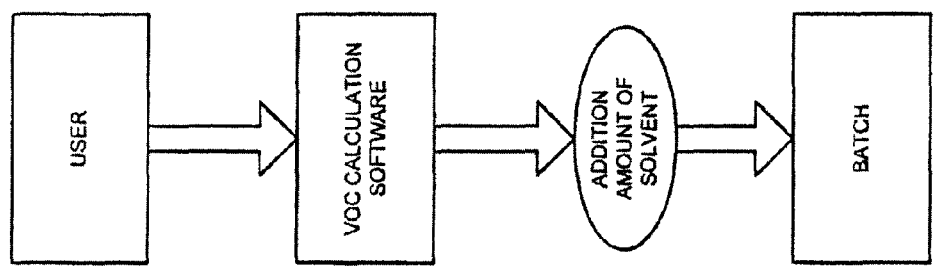
FIG. 1 is a block diagram depicting a software system for performing volatile organic compound (VOC) calculations.

FIG. 1 is a block diagram depicting at 30 a software system for performing volatile organic compound (VOC) calculations. The software system 30 can be used to assist in the manufacturing of batches of paint or other compositions. A user 40 provides information to VOC calculation software 50. The VOC calculation software 50 determines an addition amount 60 of solvent that should be made to a batch 70, such as a batch of paint that is being manufactured.

Figure 2:
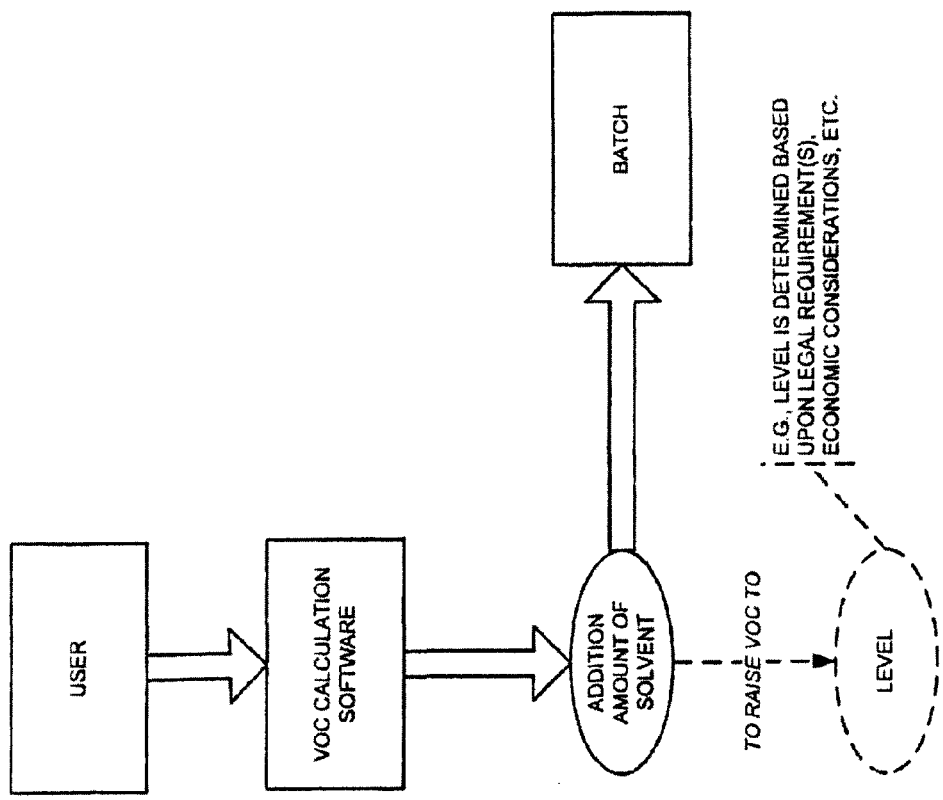
FIG. 2 is a block diagram depicting VOC calculation software basing its calculations upon one or more criteria.

FIG. 2 illustrates that the VOC calculation software 50 can base its determinations upon one or more criteria. For example, a VOC calculator can determine the corrective addition of solvent to a factory batch to raise the VOC to a particular level 100 or number (but within a legal limit). Such a tool can make it easier for a factory technician to make an addition to the batch with greater confidence.

Figure 3:
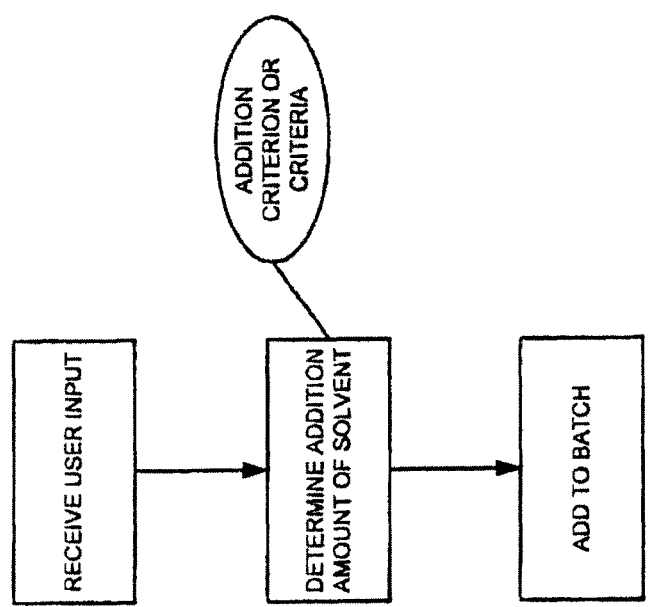
FIG. 3 is a flowchart depicting an operational scenario for determining an addition amount of solvent for a batch.

FIG. 3 is a flowchart depicting an operational scenario for determining an addition amount of solvent for a batch. The calculator receives information about the batch, such as receiving input from a user at step 100. At step 110, the software program determines the addition amount of solvent to be made based upon one or more criteria 120. At step 130, the addition can then be made to the batch if desired.

Figure 4:
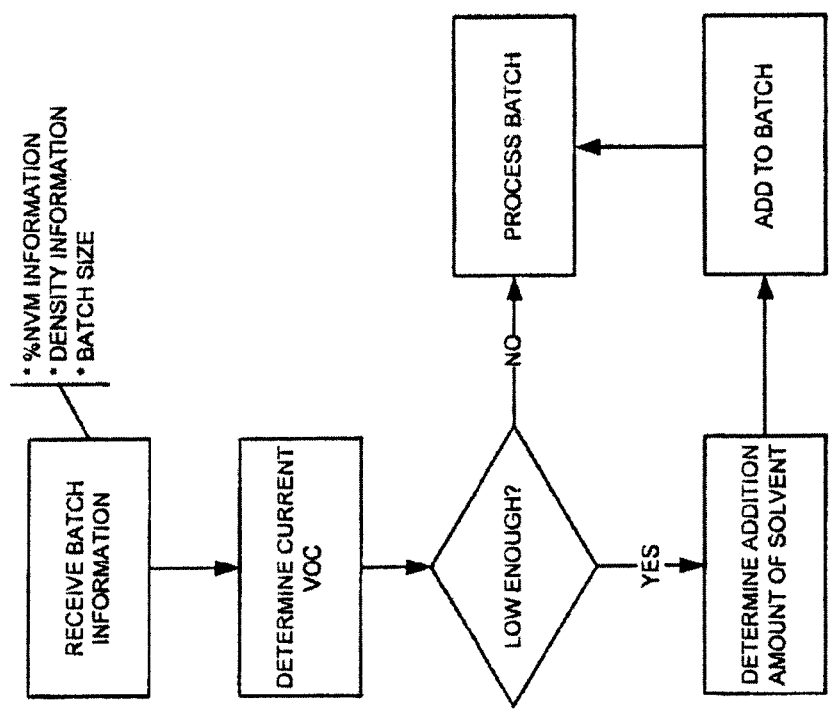
FIG. 4 is a flowchart depicting another operational scenario for determining an addition amount of solvent for a batch.

FIG. 4 is a flowchart depicting another operational scenario occurring within a plant for determining an addition amount of solvent for a batch. During production of a batch in a plant, batch information is provided at step 200 such as from a user and/or another computer program. The batch information can include percentage of non-volatile material (e.g., % NVM), density (e.g., parts per gram), batch size, etc.

The current VOC of the batch is determined at step 210, and if it is not low enough (e.g., with respect to legal requirements and/or other requirements) as determined at decision step 220, then the batch can be processed at step 250. If it is, then an addition amount can be determined at step 230 and added to the batch at step 240. The batch can then be processed at step 250.

It should be understood that similar to the other process flows described herein, the steps and the order of the steps in this operational scenario may be altered, modified and/or augmented and still achieve the desired outcome. For example, FIG. 5 illustrates where financial data can be determined and analyzed as well as an addition amount of solvent for a batch.

Figure 5:
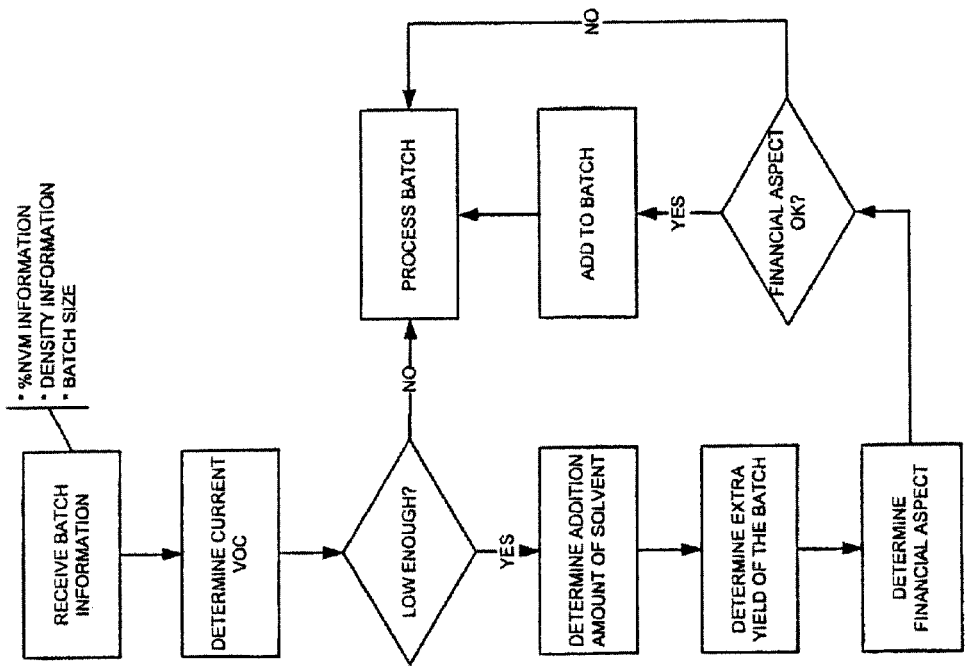
FIG. 5 is a flowchart depicting use of financial analysis for determining how to process a batch.

With reference to the flowchart of FIG. 5, the tool can calculate the VOC level of a batch at step 210 and, if desirable, determines at step 230 the amount of VOC solvent needed to raise the batch VOC to a targeted level which can be set by the Quality Assurance (QA) or formulation department. The program can calculate at step 260 the extra yield of the batch and determine at step 270 the financial aspects associated with the addition. If the financial aspects are not satisfactory as determined at decision step 280, then processing proceeds to step 250. If the financial aspects are satisfactory as determined at decision step 280, then the addition can be added to the batch at step 240 so that the batch can be processed at step 250.

As an illustration, a financial decision can be based upon a determined minimum return of profit required by making a batch addition, minus, the time required to make that addition times the cost of labor and overhead. The process can let the operator see the potential profit reaped if a batch addition is called for when certain information is entered into the spreadsheet. The process can also be configured to return an answer of 'NO' if the batch addition will not generate a set amount of profit either by too small a batch addition to hit the required target or the labor charge exceeds the profit returned. The process can also return an answer of 'NO' if the batch addition is above a set level of VOC (e.g., the tip level) and is too close to the required VOC.

The process can also be configured such that the batch VOC is to be below a maximum set level and yield a set minimum profit return, with both sets of criteria being met for the batch addition to proceed.

A VOC and batch addition calculation tool can be used in many different software implementations, such as being incorporated into a spreadsheet as shown at 300 in FIG. 6. FIG. 6 depicts a screen display of a batch addition tool for calculating an addition to a production batch and profitability of such an addition. The columns of the spreadsheet are shown at 310, and the rows are shown at 320. The example also illustrates analysis of the profitability potential of adjusting a formula using batch history data.

As shown in row 4 of column D (i.e., cell [D4]) in FIG. 6, a 2700 gallon batch of polyurethane satin floor coat is in the process of being tested in Quality Control for % NVM (solids) and Density (PPG). These two numbers are input via cells [E4] and [F4] to the spreadsheet program along with batch size. As discussed below, the program determines the current VOC and if low enough will determine the addition of low cost solvent to raise the VOC of the batch. The program also calculates the extra yield of the batch and the profit gained by the addition, also deducting for labor time.

For example, a batchmaker or quality assurance person working on the batch enters a few measurements and other information to start the process, such as percent non-volatile material (% nvm), and weight per gallon (e.g., measured at 77 degrees Fahrenheit). These are entered into the spreadsheet formula process at cells [E4] and [F4]. The batch size is determined from any accepted and approved method and entered in cell [D4].

The formula code number is entered in cell [A4]. Data can be stored in the program and retrieved by formula code number or entered as needed for any particular batch and formula. The formula code number indicates the formula that is being manufactured.

The desired target VOC for the batch is entered in cell [I4] (e.g., 447). This is the set-point VOC which the operator wants the batch to approach.

The formula cost in dollars per gallon is placed into cell [P4] (e.g., $5.07). This is the cost of the formula being manufactured.

The cost of VOC solvent to be added to the batch is placed in cell [Q4] as cost per gallon (e.g., $1.61). This is the cost of the VOC solvent to be used in the batch addition.

A VOC tip level (a failsafe; e.g., VOC>444.5) is used so that batches with VOC above this limit will not be adjusted higher. To accomplish this, cell [R4] contains a formula as follows: R4=SUMIF(G4,"<444.6",M4). Profit of the batch addition is returned as the value of cell [M4] if the initial VOC in cell [G4] is below the set-point of 444.6. In other words, cell [R4] returns the value [M4] of the adjusted batch profit if the batch VOC [G4] is below the tripwire VOC limit set at 444.6; if the VOC is at or above the tripwire limit (>444.5) then the cell returns a value of $0. It may be profitable (>$19) to add a solvent such as mineral spirits to a batch when the VOC is between the low set limit (>444.5) and the set VOC point (447)).

A minimum profit required to proceed with the addition is used within the spreadsheet. (e.g., $19). Cell [T4] is involved in the profit tip level failsafe, wherein profit has to meet or exceed this target to proceed with batch addition (and if both tip levels are satisfied cell [S4]). An example tip level is $19 profit after $25 is deducted for labor to make the addition (e.g., batch addition has to meet or exceed $44). Cell [T4] in this example contains the following equation: T4=SUMIF (M4,">19",M4). The ">19" argument in the equation is the target value to proceed with mineral spirits addition, after labor is deducted.

Labor and overhead charge per hour for addition is accounted for in cell [M4] (e.g., $25/hour).

Cell [C4] which is the weight of the batch in pounds is calculated by multiplying the volume of the batch [D4] times the weight per gallon of the batch [F4]. The equation is: C4=D4*F4. This calculation is used to determine the VOC of the batch and to calculate the possible addition of VOC solvent to the batch.

Another output value is the output shown in cell [S4] which represents the permission to proceed with batch addition if fail-safe check-points cell [R4] equals cell [T4]. More specifically, cell [S4] returns the adjusted batch profit from cell [T4], if the batch is below the set-point VOC target in cell [I4] and the adjusted batch profit in cells [M4 and T4] is above the set-point minimum in cell [S4], otherwise the cell returns $0 and a 'NO' answer is generated in cell [L4] (i.e., do not proceed with batch addition). In this example both requirements are to be met in order to proceed with a mineral spirits addition, such as in this example Profit>$19, VOC<444.6. The equation of cell [S4] is: S4=IF(R4=T4,T4,0).

Cell [G4] is the calculated VOC of the batch based on measured percent non-volatile material [E4] and measured weight per gallon [F4] (e.g., VOC=431). The batch VOC [G4] is equal to (100% minus % Batch Solids)×1.198(liter ^quart constant)×[F4] Batch PPG: G4 (100−E4)*1.198*F4.

Cell [H4] is the calculated initial solids weight (e.g., 10627 pounds). The batch solids [H4] equals ([D4] Batch Size×[F4] Batch wt/g×[E4] % Batch Solids divided by 100%): H4= (D4*F4*E4/100).

Cell [J4] is the calculated batch addition in pounds of VOC solvent (e.g., 734 pounds of mineral spirits). Addition of mineral spirits [J4] equals ([H4] Current Batch Solids×100%) divided by ([O4] Target Batch Solids)) minus ([D4] Batch Size×[F4]Batch PPG: J4=(H4)*100/(O4)−(D4)*(F4).

Cell [K4] is the calculated batch addition of gallons of VOC solvent (e.g., 115 gallons of mineral spirits). The following equation converts the Addition of mineral spirits from pounds [J4] to gallons [K4]: K4=J4/6.4

Cell [L4] is provided as output and represents the yes/no permission to proceed with batch addition. Cell [L4] returns a [yes−no] stipulation to proceed with batch addition if the criteria are met in cell [S4], criteria set by operator, minimum profit returned by making batch addition set at $19 after labor deducted and starting VOC set at a minimum of below 444.5 (to avoid possible batch addition that might exceed shipping target). The equation of cell [L4] represents that the value of the added mineral spirits at the cost of final product, minus $25 labor charge, has to exceed the set value of $19 profit to make addition to a batch): L4=IF(M4>19,"yes","no").

Cell [M4] is the calculated profit from the batch addition minus labor charge (e.g., $371) if the batch addition were to proceed. More specifically, the added Batch Profit [M4]

equals ([P4] product cost per gallon×[J4] amount of extra mineral spirits added divided by PPG of Mineral spirits) minus $25 labor charge and minus ([Q4] cost per gallon of mineral spirits×[J4] amount of extra mineral spirits added divided by PPG of mineral Spirits): M4=((P4*J4/6.4)−25−(Q4*J4/6.4)).

Cell [N4] is the calculated yield of batch in gallons after the batch addition (e.g., 2,815 gallons) if the calculated batch addition were to proceed. More specifically in this example, new batch size [N4] equals start batch size [D4] and mineral spirits added [J4] divided by PPG (e.g., 6.4) of Mineral spirits: N4=D4+J4/6.4.

Cell [O4] is the calculated Target percent Non-volatile material (% nvm) after batch addition (e.g., 50.45). More specifically in this example, cell [O4] is the target % nvm that is based upon the set VOC limit in cell [I4] and the measured wt/gallon in cell [F4]: O4=100−((I4)/((F4)*1.198)). This may be with the assumption that the VOC solvent (e.g., mineral spirits) used, is lower in weight per gallon than the finished product.

Figure 7:
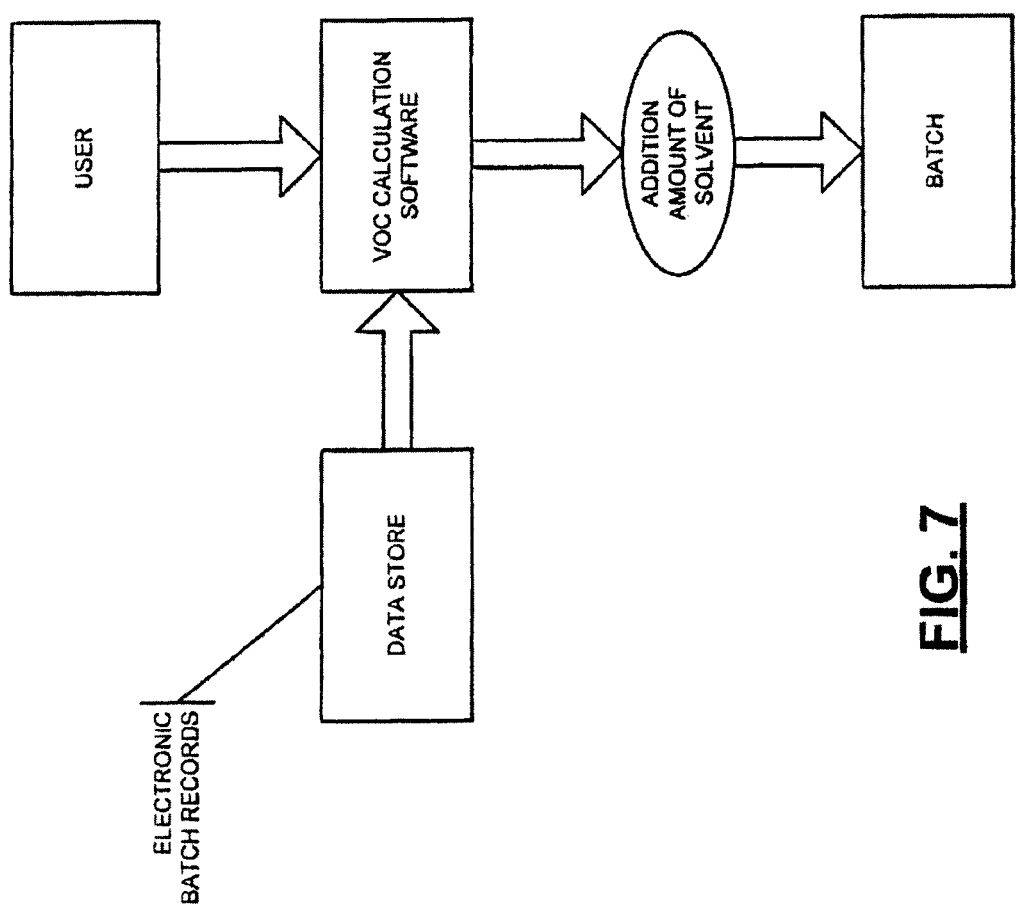
FIG. 7 is a block diagram depicting a VOC calculator system being used with electronic batch records.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration of the wide scope of the systems and methods disclosed herein, FIG. 7 shows that a VOC calculator system 420 can be used with electronic batch records as stored in a data store 400. For example, along with a VOC calculator, a support program spreadsheet can take data from EBR (Electronic Batch Records) and that data is copied whole into a spreadsheet that analyzes product performance, VOC calculations, and predictions of possible profit from batch adjustments, as well as generate automatic charts with before and after adjustment.

Figure 8:
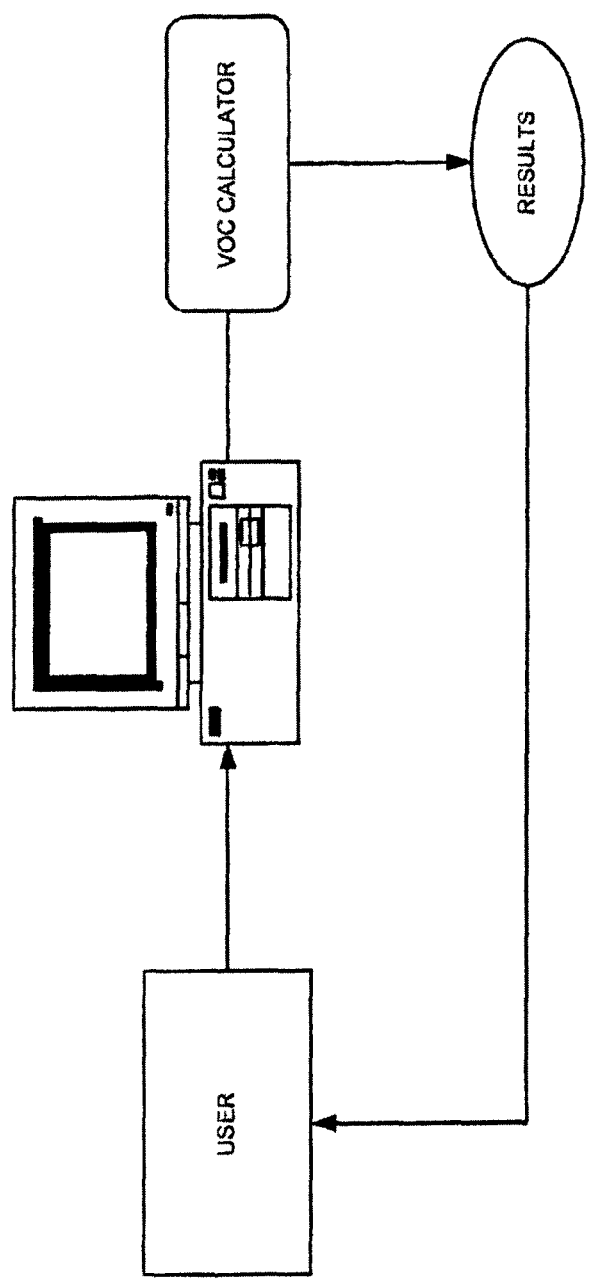
FIG. 8 is a block diagram depicting VOC calculation software being implemented on a single general purpose computer or workstation.

It is further noted that the systems and methods may be implemented on various types of computer architectures, such as for example on a single general purpose computer or workstation, or on a networked system, or in a client-server configuration, or in an application service provider configuration. As an illustration, FIG. 8 depicts VOC calculation software 50 being implemented on a single general purpose computer or workstation 500. Results 510 (e.g., addition results, financial analysis results, etc.) of the VOC calculation software 50 are provided to the user 40.

Figure 9:
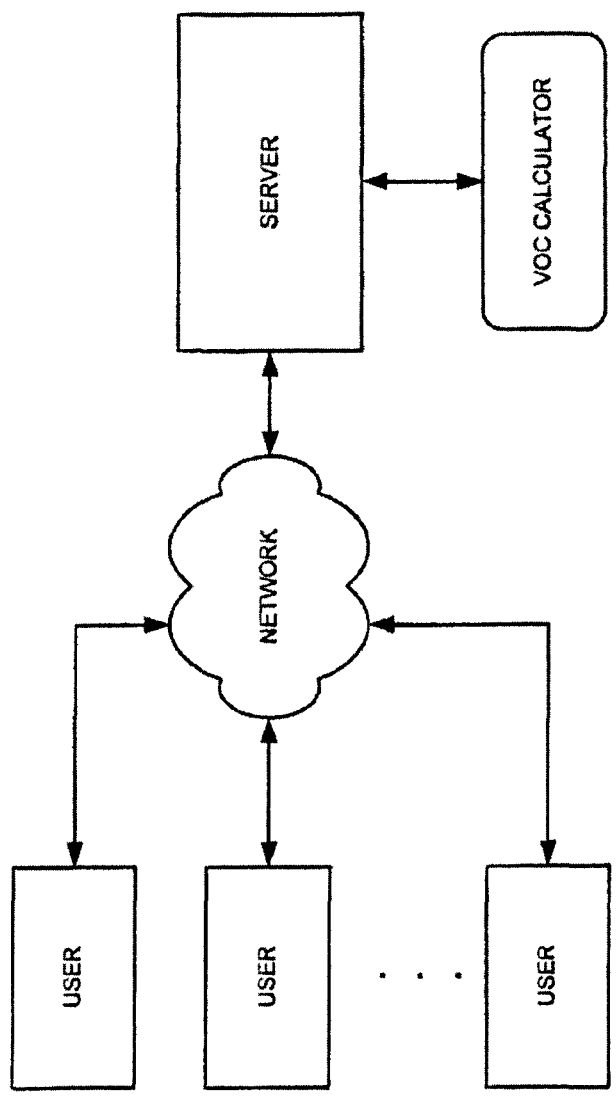
FIG. 9 is a block diagram depicting an environment wherein users can interact with VOC calculation software over one or more networks.

As another illustration, FIG. 9 depicts an environment wherein users (e.g., user 40) can interact with VOC calculation software 50. The users can interact with the VOC calculation software system 50 through a number of ways, such as over one or more networks 600. A server 610 accessible through the network(s) 600 can host the VOC calculation software system 50. The VOC calculation software system 50 can be an integrated web-based reporting and analysis tool that provides users flexibility and functionality for performing batch-related analysis.

It is further noted that the systems and methods may include data signals conveyed via networks (e.g., local area network, wide area network, interne, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores (e.g., data structures, databases, flat files, RAM, etc.) described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented system for use in processing a paint batch, comprising:
 one or more data processors;
 one or more computer-readable mediums encoded with software for commanding the one or more data processors, wherein the software includes:
 an input software mechanism for receiving input related to the paint batch; and
 volatile organic compound software instructions configured to determine an addition amount of solvent to add to the paint batch, wherein the volatile organic compound software instructions command steps that include:
 determining an amount of volatile organic compound present in the paint batch;
 determining an amount of solvent that when added to the paint batch will increase the amount of volatile organic compound present in the batch to a predetermined volatile organic compound limit, wherein the volatile organic compound limit is based on a governmental-related criteria that limits an amount of volatile organic compounds that is permitted within the paint batch;

calculating an increase in yield of the paint batch based on a starting batch size, the determined amount of solvent, and a density of the solvent;

determining an increase in the profitability of the paint batch based on the increase in yield;

instructing to add the determined amount of the solvent when the increase in profitability meets a profitability threshold; and instructing not to add the solvent when the increase in profitability fails to meet the profitability threshold;

whereby the determined addition amount of solvent is used in generating the paint batch.

2. The system of claim 1, wherein the determined addition amount of solvent is for use by a factory technician to generate the paint batch.

3. The system of claim 2, wherein the input software mechanism is configured for use by the factory technician to enter the paint batch input data.

4. The system of claim 1, wherein the paint batch input data includes percentage of non-volatile material associated with the paint batch, density associated with the paint batch, and size of the batch.

5. The system of claim 1, wherein the predetermined volatile organic compound limit is set by a paint quality assurance department or paint formulation department.

6. The system of claim 1, wherein the volatile organic compound software instructions are configured to provide an indication to a user as to whether the addition amount is to be used.

7. The system of claim 6, wherein the profitability threshold is set based on a minimum return of profit required by making the addition amount plus time required to make the addition amount times the cost of labor plus overhead.

8. The system of claim 6, wherein the indication to the user includes information related to potential profit gained if the addition amount is added to the paint batch.

9. The system of claim 6, wherein the indication to the user includes an indication that the addition is not to be made if the addition amount does not generate a set amount of profit either because the amount of volatile organic compound present in the paint batch is determined to be too high or labor charges exceed profit returned.

10. The system of claim 1 further comprising a spreadsheet software program that contains the input software mechanism and the volatile organic compound software instructions.

11. The system of claim 1 further comprising:

a support program for analyzing data from electronic batch records with the determined addition amount.

12. The system of claim 1, wherein the profitability of the paint batch is determined according to the following equation:

$$M = \left(P \times \frac{J}{D}\right) - C - \left(Q \times \frac{J}{D}\right),$$

where M represents the profitability of the paint batch, P represents product cost per gallon, J represents the amount of the solvent, D represents a density of the solvent, C represents the cost of labor, and Q represents the cost of the solvent per gallon.

13. The system of claim 1, wherein the yield of the paint batch is determined according to the following equation:

$$N = S + \frac{J}{D},$$

where N represents the yield of the paint batch, S represents a start batch size, J represents the amount of the solvent, and D represents a density of the solvent.

14. A computer-implemented method for processing a paint batch, comprising:

receiving, using one or more data processors, input related to the paint batch; and determining, using one or more data processors, an addition amount of solvent to add to the paint batch, wherein determining the addition amount includes:

determining, using one or more data processors, an amount of volatile organic compound present in the paint batch;

determining, using one or more data processors, an amount of solvent that when added to the paint batch will increase the amount of volatile organic compound present in the batch to a predetermined volatile organic compound limit, wherein the volatile organic compound limit is based on a governmental-related criteria that limits an amount of volatile organic compounds that is permitted within the paint batch;

calculating, using one or more data processors, an increase in yield of the paint batch based on a starting batch size, the determined amount of solvent, and a density of the solvent;

determining, using one or more data processors, an increase in the profitability of the paint batch based on the increase in yield;

instructing, using one or more data processors, to add the determined amount of the solvent when the increase in profitability meets a profitability threshold; and instructing, using one or more data processors, not to add the solvent when the increase in profitability fails to meet the profitability threshold;

whereby the determined addition amount of solvent is used in generating the paint batch;

wherein the steps of the method are performed using one or more data processors.

15. The method of claim 14, and further comprising:

setting the profitability threshold based on a minimum return of profit required by making the addition amount plus time required to make the addition amount times the cost of labor plus overhead.

16. The method of claim 14, and further comprising:

determining the profitability of the paint batch according to the following equation:

$$M = \left(P \times \frac{J}{D}\right) - C - \left(Q \times \frac{J}{D}\right),$$

where M represents the profitability of the paint batch, P represents product cost per gallon, J represents the amount of the solvent, D represents a density of the solvent, C represents the cost of labor, and Q represents the cost of the solvent per gallon.

17. The method of claim 14, and further comprising:

determining the yield of the paint batch according to the following equation:

$$N = S + \frac{J}{D},$$

where N represents the yield of the paint batch, S represents a start batch size, J represents the amount of the solvent, and D represents a density of the solvent.

18. A tangible computer-readable storage medium encoded with instructions that cause a computer to perform a method for processing a paint batch, said method comprising:
    receiving input related to the paint batch; and
    determining an addition amount of solvent to add to the paint batch, wherein determining an addition amount includes:
        determining an amount of volatile organic compound present in the paint batch;
        determining an amount of solvent that when added to the paint batch will increase the amount of volatile organic compound present in the batch to a predetermined volatile organic compound limit, wherein the volatile organic compound limit is based on a governmental-related criteria that limits an amount of volatile organic compounds that is permitted within the paint batch;
    calculating an increase in yield of the paint batch based on a starting batch size, the determined amount of solvent, and a density of the solvent;
    determining an increase in the profitability of the paint batch based on the increase in yield;
    instructing to add the determined amount of the solvent when the increase in profitability meets a profitability threshold; and
    instructing not to add the solvent when the increase in profitability fails to meet the profitability threshold;
whereby the determined addition amount of solvent is used in generating the paint batch.

* * * * *